(12) United States Patent
Bryant

(10) Patent No.: US 9,139,121 B2
(45) Date of Patent: Sep. 22, 2015

(54) HALF-TILT BED UNLOADING SYSTEM

(71) Applicant: GM Global Technology Operations LLC, Detroit, MI (US)

(72) Inventor: Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 13/746,861

(22) Filed: Jan. 22, 2013

(65) Prior Publication Data

US 2014/0205404 A1    Jul. 24, 2014

(51) Int. Cl.
*B60P 1/28* (2006.01)
*B60P 1/64* (2006.01)
*B60P 3/00* (2006.01)

(52) U.S. Cl.
CPC ... *B60P 1/28* (2013.01); *B60P 1/64* (2013.01); *B60P 3/007* (2013.01)

(58) Field of Classification Search
CPC .............. B60P 1/28; B60P 3/007; B60P 1/64
USPC ......... 414/470, 480, 545, 530–536, 537, 444, 414/812, 809; 298/10, 18, 1 A, 183.2; 410/6, 4, 51, 80
See application file for complete search history.

(56) References Cited

U.S. PATENT DOCUMENTS

| | | | | | |
|---|---|---|---|---|---|
| 1,831,489 | A | * | 11/1931 | Flowers | 298/17.7 |
| RE20,760 | E | * | 6/1938 | Ludington | 414/470 |
| 3,368,704 | A | * | 2/1968 | Pope | 414/545 |
| 3,369,684 | A | * | 2/1968 | Ford | 414/498 |
| 3,891,102 | A | * | 6/1975 | Blount | 414/545 |
| 3,998,343 | A | * | 12/1976 | Fors | 414/501 |
| 4,009,792 | A | * | 3/1977 | Sano et al. | 414/512 |
| 4,087,007 | A | * | 5/1978 | Drews | 414/545 |
| 5,062,757 | A | * | 11/1991 | Eichenauer | 414/24.5 |
| 5,482,494 | A | * | 1/1996 | Ishimoto | 446/456 |
| 6,540,464 | B1 | * | 4/2003 | Maclay | 414/111 |
| 6,698,996 | B2 | * | 3/2004 | Smith, Jr. | 414/471 |
| 7,059,666 | B2 | * | 6/2006 | Harrison | 296/186.4 |
| 7,524,159 | B2 | * | 4/2009 | Mammone et al. | 414/812 |
| 7,658,587 | B1 | * | 2/2010 | Dierks et al. | 414/484 |
| 7,963,738 | B1 | * | 6/2011 | Haulsey | 414/480 |
| 8,043,040 | B2 | * | 10/2011 | Nespor | 414/545 |
| 2006/0285958 | A1 | * | 12/2006 | Wilhelm | 414/529 |
| 2007/0031228 | A1 | * | 2/2007 | Wilson | 414/545 |
| 2008/0101900 | A1 | * | 5/2008 | Harber | 414/470 |
| 2013/0272827 | A1 | * | 10/2013 | Wegmuller | 414/343 |

FOREIGN PATENT DOCUMENTS

| | | | | | |
|---|---|---|---|---|---|
| FR | 2573372 | A1 | * | 5/1986 | |
| GB | 2124179 | A | * | 2/1984 | B60P 1/44 |
| JP | 62191243 | A | * | 8/1987 | |
| JP | 04323117 | A | * | 11/1992 | |

* cited by examiner

*Primary Examiner* — Kaitlin Joerger
(74) *Attorney, Agent, or Firm* — BrooksGroup

(57) ABSTRACT

One variation may include a product including: a vehicle including a cargo bed comprising a tilting portion and a non-tilting portion.

21 Claims, 4 Drawing Sheets

HALF-TILT BED UNLOADING SYSTEM

TECHNICAL FIELD

The field to which the disclosure generally relates to includes vehicles and methods of loading and unloading the same.

BACKGROUND

Urban delivery routes often require sequential delivery of goods and simultaneous pickup of return cargo along the route. Trucks with single loading points do not work well in this scenario and require an isle away to allow incoming and outgoing cargo to be swapped within the cargo area.

SUMMARY OF ILLUSTRATIVE VARIATIONS OF THE INVENTION

One variation may include a product including a vehicle including a cargo bed comprising a tilting portion and a non-tilting portion, the vehicle having a first longitudinal side and an opposite second longitudinal side, the tilting portion being constructed and arranged so that one side of the tilting portion nearest the second longitudinal side of the vehicle may be lowered with respect to an opposite side of the tilting portion nearest the first longitudinal side of the vehicle.

One variation may include a method including providing a vehicle including a cargo bed comprising a tilting portion and a non-tilting portion, the vehicle having a first longitudinal side and an opposite second longitudinal side, the tilting portion being constructed and arranged so that one side of the tilting portion nearest the second longitudinal side of the vehicle may be lowered with respect to an opposite side of the tilting portion nearest the first longitudinal side of the vehicle, the cargo bed having a front and a rear, and wherein the tilting portion is nearest the front of the cargo bed and wherein the non-tilting portion is adjacent the tilting portion, loading cargo onto the cargo bed from the rear of the cargo bed and unloading cargo from the cargo bed comprising tilting the tilting portion of the bed.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
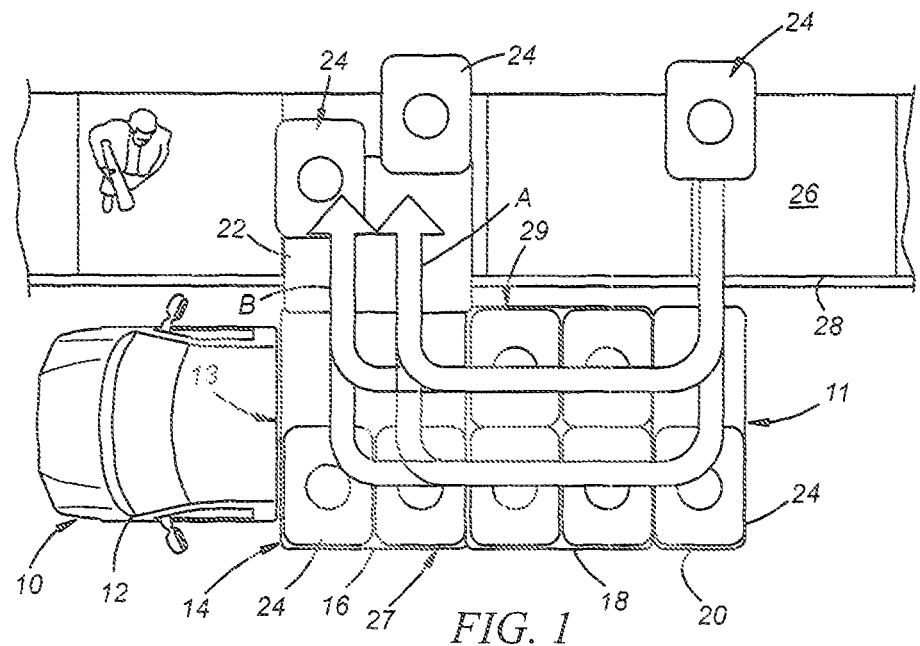
FIG. 1 is a plan view illustrating a vehicle including a cargo bed having a portion that tilts and a method a method of loading and unloading cargo onto the vehicle according to a number of variations of the invention.

A number of variations are illustrated in FIG. 1 and may include a vehicle 10 having an operator portion 12 such as, but not limited to, an operator cab that may be connected to a frame of the vehicle, and a cargo bed 14 that may also connected to the frame of the vehicle. The cargo bed 14 may include a tilting portion 16. The cargo bed 14 may also include a non-tilting portion 18. In a number of variations the non-tilting portion 18 may be fixed so that the non-tilting portion does not move in a vertical direction and does not tilt. Optionally, the cargo bed 14 may include a lift gate portion 20 which may be positioned near the rear of the vehicle 10. In one variation the lift gate portion 20 may be raised and lowered so the surface of the lift gate portion 20 on which the cargo rests is not tilted. In a number of other variations, a lift gate may be provided separate from the cargo bed 14 and may extending from the bed 14. In a number of other variations of the invention a lift gate may be constructed and arranged to swing under the bed 14 when not in use.

As illustrated in FIG. 1, cargo such as, but not limited to, containers 24 may be loaded on to the vehicle 10 from the rear 11 of the vehicle. In a number of variations, the containers 24 may be loaded onto the lift gate portion 20 and slid or rolled along the bed 14 from the rear 11 towards the front 13 of the bed 14 as illustrated by arrows A and B. The containers 24 may remain on either a first longitudinal side (street side) 27 or an opposite second longitudinal side (curb side) 29 of the vehicle as the containers 24 are moved from the rear 11 to the front 13 of the bed 14 of the vehicle 10. The containers 24 may be moved from the street side 27 to the curbside 29 and vice versa as they move from the rear 11 the vehicle to the front 13 of the bed 14. Containers 24 may be loaded off of the front or side of the vehicle using the tilting portion 16 of the bed. Optionally, a side ramp 22 may be connected to the tilting portion 16 of the bed. The side ramp 22 may slide out from under the bed 14, may be pivotally connected to the vehicle to flip down, or may be otherwise stored elsewhere on the vehicle and then when needed may be attached to the tilting portion 16 of the bed to more easily facilitate the loading and unloading of cargo from the side of the vehicle 10. A vehicle 10 including a bed 14 having a tilting portion 16 may be particularly useful in urban areas and may allow the loading and unloading of the vehicle 10 from a location near a sidewalk 26 which may have a curb 28.

Figure 2:
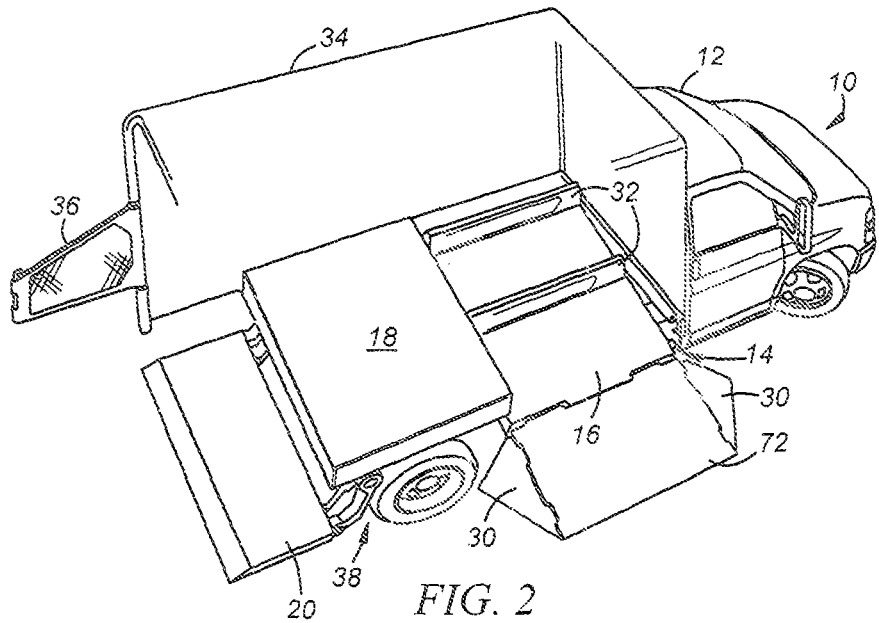
FIG. 2 is a perspective view of a vehicle with portions removed wherein the vehicle includes a portion of a bed that tilts according to a number of variations of the invention.

A number of variations of the invention are illustrated in FIG. 2 and may include one or more side ramp extensions 30 which may be attached to the side ramp 22. In a number of variations the side ramp extensions 30 may be pivotally connected to the side ramp 22 or may be removeably attached to the side ramp 22 to facilitate loading and unloading of cargo in cramped quarters. In a number of variations, the tilt portion 16 of the bed 14 may include one or more wheel chucks 32 constructed and arranged to prevent cargo such as a container having wheels thereon from rolling off of the tilt portion 16 when one side of tilt portion 16 has been lowered. The wheel chucks 32 may be stationary, or may be retracted manually or by a powered assist system connected thereto so that an operator may selectively lower and raise the wheel chucks 32 as desired. The vehicle 10 may optionally include a full or partial enclosure 34 to enclose or cover cargo carried on the bed 14 of the vehicle.

Figure 3:
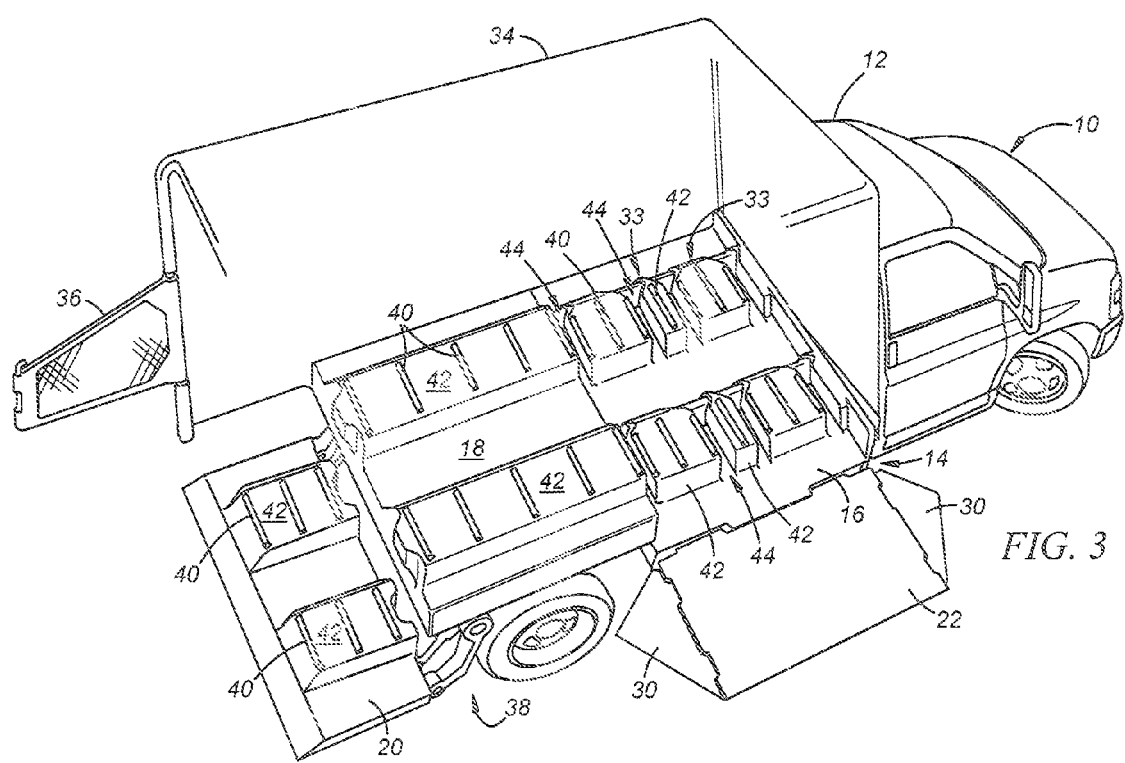
FIG. 3 is a perspective view of a vehicle with portions removed wherein the vehicle includes a portion of a bed that tilts according to a number of variations of the invention.

A number of variations of the invention are illustrated in FIG. 3 and may include a plurality of rollers 40 positioned along the bed 14 to allow containers to be pushed or rolled forward in the vehicle 10. In a number of variations, container elevated platforms 42 may be provided to support the bottom of containers and to lift the container wheels above the bed 14 so that the containers can be pushed in a direction 90° to their fixed wheels. In a number of other variations constrainers 24 with wheels that rotate and pivot may be used. The elevated platforms 42 may also be constructed and arranged to control the path of the containers as they are loaded onto the vehicle 10. In a number of variations wheel chucks details 33 may be provided to keep containers in place during the tilting operation of the tilt portion 16 of the bed 14. The wheel chuck details 33 can be overcome by manually pulling on the containers so that the containers slide or roll over the wheel chucks details 33. The wheel chuck details 33 may also be retracted to facilitate unloading of containers 24. In a number of variations wheel roll through channels 44 may be provided in the bed or the container elevation platforms 42 and constructed and arranged to allow container wheels to pass through the elevated platform portion 42 so that the container may be rolled down the tilt portion 16 and moved off of the vehicle 10.

Figure 4:
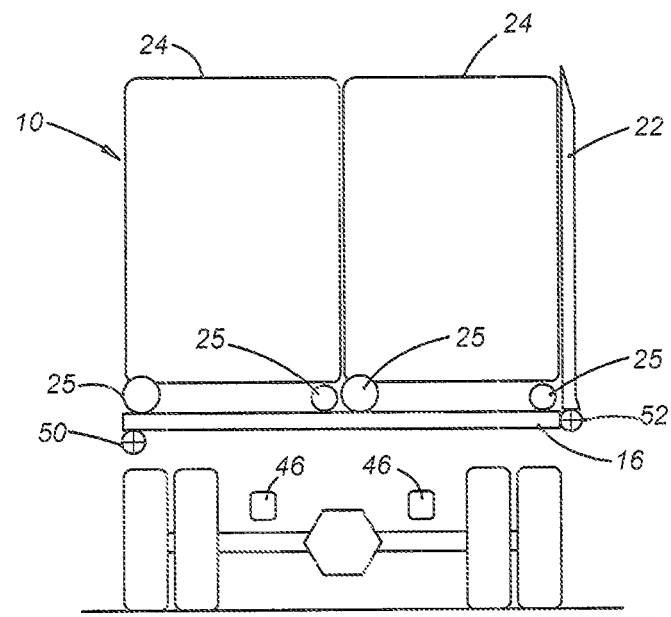
FIG. 4 is a schematic illustration of a section of a vehicle including a portion of a bed that tilts according to a number of variations of the invention.
Figure 5:
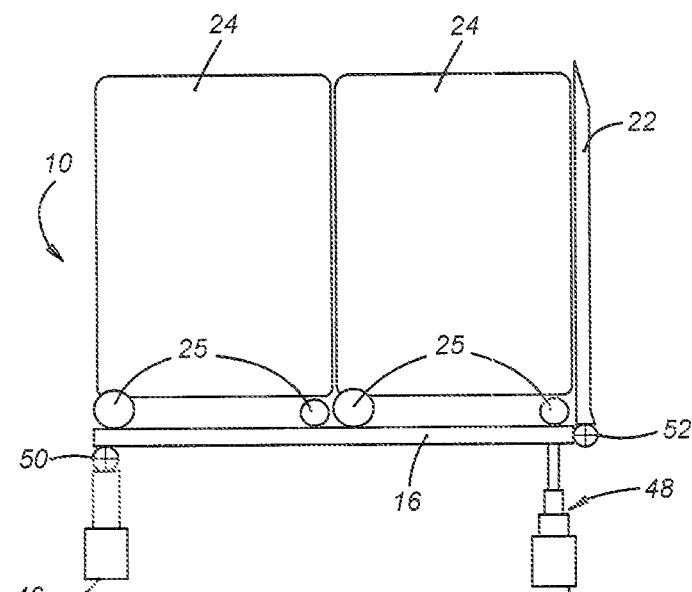
FIG. 5 is a schematic sectional view of a few: including a portion of a bed that tilts and a lift system connected to the portion of the bed according to a number of variations of the invention.

A number of variations are illustrated in FIG. 4 and may include a first pivot joint or hinge 50 connected to the tilt portion 16 of the bed. In a number of variations the first pivot joint or hinge 50 may be provided at one side of the tilt portion 16 of the bed. In a number of variations a side ramp 22 may be connected to the tilt portion 16 of the bed by a second pivot joint or hinge 52 positioned at a second side of the tilt portion 16 of the bed. The tilt portion 16 of the bed may be connected to the frame 46 of the vehicle 10.

In a number of variations of the invention, the tilt portion 16 of the bed may be pivotally connected to the frame and a lift system 48 such as, but not limited to, an electrically driven piston, a hydraulic piston, or a pneumatic piston supported by the frame 46 or other suitable support structure and operatively positioned to raise and lower one side of the tilt portion 16 of the bed.

Figure 6:
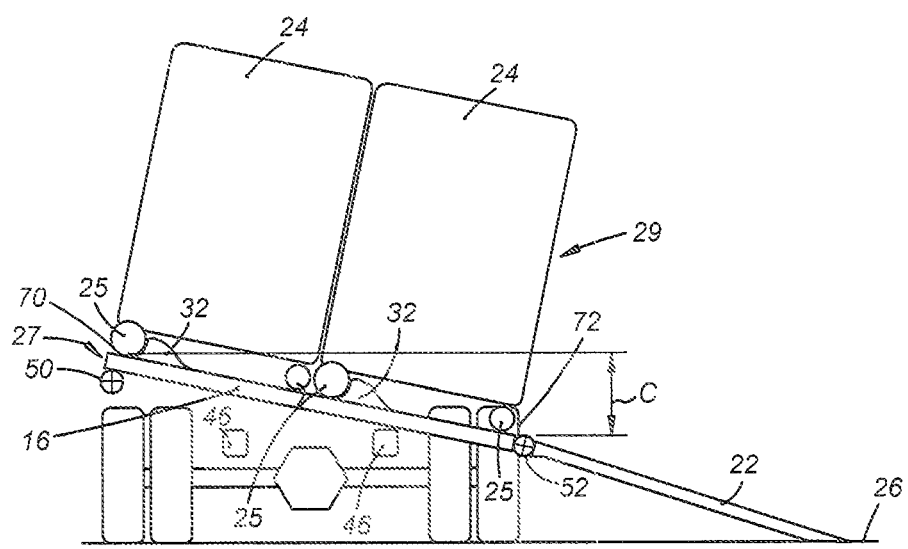
FIG. 6 is a schematic illustration of the vehicle illustrated in FIG. 5 showing a portion of a bed in a tilted position according to a number of variations of the invention.

FIG. 6 illustrates a number of variations of the invention and shows the tilt portion 16 of the bed lowered along one side. A side ramp 22 may be flipped downward to provide a ramped path for the containers to travel down to a sidewalk 26 or other suitable platform. The tilt portion 16 may be lowered on one side a vertical distance as illustrated by arrow C between a surface 70 of the bed 14 on one side 27 of the vehicle and a surface 72 on the opposite side 29 of the vehicle 10. That is, the tilt portion of the bed 14 may be lowered on one side 29 of the vehicle with respect to the other side 27 of the vehicle so the surface 70 on one side of the vehicle is at a different height than the surface 72 of the bed 14 on the other side of the vehicle 10. In a number of variations the vertical distance or height difference illustrated by arrow C may be at least 4 inches, at least 6 inches, at least 12 inches, at least 18 inches, at least 24 inches, at least 36 inches, or any distance or length between 2 inches and 36 inches. It should be appreciated that although the tilt portion 16 in the bed is shown as pivoting about the first pivot joint or hinge 50 located at one side 27 of the tilt portion 16 of the bed, the first pivot joint or hinge 50 may be located at another location along the width of the tilt portion 16 of the bed.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: a vehicle including a cargo bed comprising a tilting portion and a non-tilting portion, the vehicle having a first longitudinal side and an opposite second longitudinal side, the tilting portion being constructed and arranged so that one side of the tilting portion nearest the second longitudinal side of the vehicle may be lowered with respect to an opposite side of the tilting portion nearest the first longitudinal side of the vehicle.

Variation 2 may include a product as set forth in Variation 1 wherein the cargo bed further comprises a lift gate portion constructed and arranged to be raised and lowered to load cargo onto the cargo bed.

Variation 3 may include a product as set forth in Variations 1-2 wherein the cargo bed has a front and a rear and wherein the tilting portion is located closest to the front and wherein the non-tilting portion is adjacent the tilting portion.

Variation 4 may include a product as set forth in Variations 1-3 wherein the cargo bed further comprises a lift gate portion constructed and arranged to be raised and lowered to load cargo onto the cargo bed, wherein the cargo bed has a front and a rear, and wherein the lift gate portion is located nearest the rear of the cargo bed.

Variation 5 may include a product as set forth in Variations 1-4 wherein the non-tilting portion is positioned between the tilting portion and the lift gate.

Variation 6 may include a product as set forth in Variations 1-5 further comprising at least one wheel chuck connected to the tilting portion of the bed and constructed and arranged to prevent a container having wheels from rolling down the tilting portion of the bed when the tilting portion of the bed is in a tilted position.

Variation 7 may include a product as set forth in Variations 1-6 wherein the at least one wheel check is selectively retractable so that a container having wheels may be rolled off of the tilting portion of the bed.

Variation 8 may include a product as set forth in Variations 1-7 further comprising a plurality of rollers connected to the bed and constructed and arranged so that the containers may be rolled from the rear of the bed toward the front of the bed.

Variation 9 may include a product as set forth in Variations 1-8 further comprising at least one container elevated platform connected to the bed and constructed and arranged to support the bottom of a container having wheels and to lift the container wheels above the bed so that the containers may be pushed in a direction 90° with respect to the wheels of the container.

Variation 10 may include a product as set forth in Variations 1-9 further comprising a plurality of rollers connected to the at least one elevated platform and constructed and arranged to allow a container to be rolled over the container elevated platform.

Variation 11 may include a product as set forth in Variations 1-10 further comprising a plurality of container elevated platforms connected to at least the tilting portion of the bed, and wherein the plurality of container elevated platforms define wheel check details for holding a container having wheels on the tilted portion when the tilting portion is in a tilted position.

Variation 12 may include a product as set forth in Variations 1-11 further comprising a plurality of container elevated platforms connected to at least the tilting portion of the bed, and wherein the plurality of container elevated platforms define wheel chuck details for holding a container having wheels on the tilted portion when the tilting portion is in a tilted position, the wheel chuck details being constructed and arranged so that a container having wheels may be manually pulled over the wheel chucks details to unload the container from the tilting portion of the bed.

Variation 13 may include a product as set forth in Variations 1-12 further comprising a plurality of container elevated platforms connected to at least the tilting portion of the bed, and wherein the plurality of container elevated platforms define wheel check details for holding a container having wheels on the tilted portion when the tilting portion is in a tilted position, a plurality of wheel roll through channels defined between container elevated platforms and constructed and arranged to selectively allow wheels of the container to pass through adjacent container elevated platforms when the container is position so that the wheels are aligned with wheel roll through channels so that the container may be unloaded from the tilting portion when the tilting portion is in a tilted position.

Variation 14 may include a product as set forth in Variations 1-13 wherein the tilting portion of the bed is pivotally connected to the vehicle by a first pivot joint or hinge.

Variation 15 may include a product as set forth in Variations 1-14 wherein the first pivot joint or hinge is located near a first side of the vehicle.

Variation 16 may include a product as set forth in Variations 1-15 further comprising a side ramp constructed and arranged to be connected to the tilting portion so that the tilting portion with the side ramp connected thereto provides a path to unload a container from the vehicle to a location below the tilting portion of the bed.

Variation 17 may include a product as set forth in Variations 1-16 wherein the side ramp is pivotally connected to the tilting portion of the bed by a second pivot joint or hinge.

Variation 18 may include a product as set forth in Variations 1-17 further comprising a power assist operatively connected to the tilting portion of the bed so that one side of the tilting portion nearest the second longitudinal side of the vehicle may be lowered with respect to an opposite side of the tilting portion nearest the first longitudinal side of the vehicle.

Variation 19 may include a product as set forth in Variations 1-18 wherein the power assist comprises at least one of the electrically driven piston, a hydraulic piston, or a pneumatic piston.

Variation 20 may include a method including providing a vehicle including a cargo bed comprising a tilting portion and a non-tilting portion, the vehicle having a first longitudinal side and an opposite second longitudinal side, the tilting portion being constructed and arranged so that one side of the tilting portion nearest the second longitudinal side of the vehicle may be lowered with respect to an opposite side of the tilting portion nearest the first longitudinal side of the vehicle, the cargo bed having a front and a rear, and wherein the tilting portion is nearest the front of the cargo bed and wherein the non-tilting portion is adjacent the tilting portion, loading cargo onto the cargo bed from the rear of the cargo bed and unloading cargo from the cargo bed comprising tilting the tilting portion of the bed.

Variation 21 may include a product as set forth in Variations 20 further comprising moving cargo from the non-tilting portion of the bed onto the tilting portion of the bed after unloading cargo from the tilting portion.

Variation 22 may include a method as set forth in Variations 20-21 wherein the cargo comprises at least one a container having wheels, and wherein the unloading cargo comprises rolling the at least one container having wheels down the tilting portion of the bed when the tilting portion of the bed is in a tilted position.

Variation 23 may include a method as set forth in variations 20-22 wherein the cargo bed further includes a lift gate portion nearest the rear of the cargo bed, the rift gate portion being constructed and arranged to be raised and lowered, and wherein the loading cargo onto the rear of the bed comprises lowering the lift gate portion, placing cargo on the lift gate portion in the lowered position, and raising the lift gate portion with the cargo thereon.

The above description of select examples of the invention is merely exemplary in nature and, thus, variations or variants thereof are not to be regarded as a departure from the spirit and scope of the invention.

What is claimed is:

1. A product comprising:
a vehicle including a cargo bed comprising a tilting portion and a non-tilting portion, the vehicle having a first longitudinal side and an opposite second longitudinal side, the tilting portion being constructed and arranged so that one side of the tilting portion nearest the second longitudinal side of the vehicle may be lowered with respect to an opposite side of the tilting portion nearest the first longitudinal side of the vehicle.

2. A product comprising:
a vehicle including a cargo bed comprising a tilting portion and a non-tilting portion, the vehicle having a first longitudinal side and an opposite second longitudinal side, the tilting portion being constructed and arranged so that one side of the tilting portion nearest the second longitudinal side of the vehicle may be lowered with respect to an opposite side of the tilting portion nearest the first longitudinal side of the vehicle, and wherein the cargo bed further comprises a lift gate portion constructed and arranged to be raised and lowered to load cargo onto non-tilting portion of the cargo bed.

3. A product as set forth in claim 1 wherein the cargo bed has a front and a rear and wherein the tilting portion is located closest to the front and wherein the non-tilting portion is adjacent the tilting portion.

4. A product as set forth in claim 1 wherein the cargo bed further comprises a lift gate portion constructed and arranged to raised and lowered to load cargo onto the cargo bed and wherein the cargo bed has a front and a rear, and wherein the lift gate portion is located nearest the rear of the cargo bed.

5. A product as set forth in claim 4 wherein the non-tilting portion is positioned between the tilting portion and the lift gate.

6. A product as set forth in claim 1 further comprising at least one wheel chuck connected to the tilting portion of the bed and constructed and arranged to prevent a container having wheels from rolling down the tilting portion of the bed when the tilting portion of the bed is in a tilted position.

7. A product as set forth in claim 6 wherein the at least one wheel chuck is selectively retractable so that a container having wheels may be rolled off of the tilting portion of the bed.

8. A product as set forth in claim 1 further comprising a plurality of rollers connected to the bed and constructed and arranged so that the containers may be rolled from the rear of the bed toward the front of the bed.

9. A product as set forth in claim 1 further comprising at least one container elevated platform connected to the bed and constructed and arranged to support the bottom of a container having wheels and to lift the container wheels above the bed so that the containers may be pushed in a direction 90° with respect to the wheels of the container.

10. A product as set forth in claim 9 further comprising a plurality of rollers connected to the at least one elevated platform and constructed and arranged to allow a container to be rolled over the container elevated platform.

11. A product comprising:
a vehicle including a cargo bed comprising a tilting portion and a non-tilting portion, the vehicle having a first longitudinal side and an opposite second longitudinal side, the tilting portion being constructed and arranged so that one side of the tilting portion nearest the second longitudinal side of the vehicle may be lowered with respect to an opposite side of the tilting portion nearest the first longitudinal side of the vehicle, and a plurality of container elevated platforms connected to at least the tilting portion of the bed, and wherein the plurality of container elevated platforms define wheel chuck details for holding a container having wheels on the tilted portion when the tilting portion is in a tilted position.

12. A product as set forth in claim 11 wherein the wheel chuck details being constructed and arranged so that a container having wheels may be manually pulled over the wheel chucks details to unload the container from the tilting portion of the bed.

13. A product as set forth in claim 11 wherein a plurality of wheel roll through channels defined between container elevated platforms and constructed and arranged to selectively allow wheels of the container to pass through adjacent container elevated platforms when the container is positioned so that the wheels are aligned with wheel roll through channels so that the container may be unloaded from the tilting portion when the tilting portion is in a tilted position.

14. A product as set forth in claim 1 wherein the tilting portion of the bed is pivotally connected to the vehicle by a first pivot joint or hinge.

15. A product as set forth in claim 12 wherein a first pivot joint or hinge is located near a first side of the vehicle.

16. A product as set forth in claim 1 further comprising a side ramp instructed arranged to be connected to the tilting portion so that the tilting portion with the side ramp connected thereto provides a path to unload a container from the vehicle to a location below the tilting portion of the bed.

17. A product as set forth in claim 16 wherein the side ramp is pivotally connected to the tilting portion of the bed by a second pivot joint or hinge.

18. A product as set forth in claim 1 further comprising a power assist operatively connected to the tilting portion of the bed so that one side of the tilting portion nearest the second longitudinal side of the vehicle may be lowered with respect to an opposite side of the tilting portion nearest the first longitudinal side of the vehicle.

19. A product as set forth in claim 18 wherein the power assist comprises at least one of the electrically driven piston, a hydraulic piston, or a pneumatic piston.

20. A method comprising:
providing a vehicle including a cargo bed comprising a tilting portion and a non-tilting portion, the vehicle having a first longitudinal side and an opposite second longitudinal side, the tilting portion being constructed and arranged so that one side of the tilting portion nearest the second longitudinal side of the vehicle may be lowered with respect to an opposite side of the tilting portion nearest the first longitudinal side of the vehicle, the cargo bed having a front and a rear, and wherein the tilting portion is nearest the front of the cargo bed and wherein the non-tilting portion is adjacent the tilting portion, loading cargo onto the cargo bed from the rear of the cargo bed and unloading cargo from the cargo bed comprising tilting the tilting portion of the bed.

21. A product as set forth in claim 1 further comprising a plurality of rollers positioned along the bed and constructed and arranged so that the containers may be rolled from the rear of the bed toward the front of the bed.

* * * * *